United States Patent [19]

Gournelle

[11] 4,025,275
[45] May 24, 1977

[54] APPARATUS FOR THE PRODUCTION OF CONTAINERS AND OBJECTS MADE OF THERMOPLASTIC MATERIALS, CARRYING PRINTED MOTIFS

[76] Inventor: Maurice Paul Gournelle, demeurant 1 rue des Bruyeres, Asnieres, France

[22] Filed: July 29, 1975

[21] Appl. No.: 599,978

Related U.S. Application Data

[62] Division of Ser. No. 438,406, Jan. 31, 1974, abandoned.

[30] Foreign Application Priority Data

Jan. 31, 1973 France .............................. 73.03314

[52] U.S. Cl. ........................... 425/387 R; 425/398; 425/403
[51] Int. Cl.² ......................................... B29C 17/00
[58] Field of Search .......... 425/387, 388, 398, 403; 264/292

[56] References Cited

UNITED STATES PATENTS

| | | | |
|---|---|---|---|
| 2,348,871 | 5/1944 | Wiley | 425/398 |
| 2,736,065 | 2/1956 | Wilcox | 264/292 X |
| 3,172,159 | 3/1969 | Edwards | 425/398 X |
| 3,172,927 | 3/1965 | Mojounier | 425/388 X |
| 3,173,174 | 3/1965 | Edwards | 425/387 X |
| 3,315,313 | 4/1967 | Steigman | 425/388 X |
| 3,338,997 | 8/1967 | Tigner | 425/388 X |
| 3,488,413 | 1/1970 | Watts | 425/398 X |
| 3,551,954 | 1/1971 | Knowles | 425/388 X |

FOREIGN PATENTS OR APPLICATIONS 1,322,860  2/1963  France ............................... 264/292

Primary Examiner—J. Howard Flint, Jr.
Attorney, Agent, or Firm—Lane, Aitken, Dunner & Ziems

[57] ABSTRACT

An apparatus for molding a sheet of thermoplastic material in which the sheet is forced into an open chamber formed in a die member by means of a punch member adapted to engage the sheet in a substantially line contact to stretch the sheet into the chamber and against the inner wall of the die member.

8 Claims, 10 Drawing Figures

PL.III.3

APPARATUS FOR THE PRODUCTION OF CONTAINERS AND OBJECTS MADE OF THERMOPLASTIC MATERIALS, CARRYING PRINTED MOTIFS

CROSS-REFERENCE TO RELATED APPLICATION

This application is a division of applicant's co-pending application Ser. No. 438,406, filed on Jan. 31, 1974 now abandoned.

This invention relates to the production —from sheets of thermoplastic material —of containers which bear printed motifs, such as text or graphic designs in one or more colors.

Methods and means of heat-forming sheets or films of thermoplastic material, used in making objects or containers such as pots, goblets, and cups intended to contain food products or other products, are well known to the expert in the field.

These means —regardless of whether they involve air depression, air blowing, punching or stamping, with or without gaseous cushion, either separately or in combination —do not achieve uniformity in the distribution of the thickness of the thermoplastic matter and particularly on the lateral portions of the objects.

These thickness irregularities, caused by the variations in elongation due to the imprecision of the means of heat-forming, are by far more important than those due to the possible heterogeneity of the material and/or its thickness tolerances during the production of good-quality films or sheets.

These inconveniences are not very important when the objects produced are to be used such but they become troublesome when they must undergo a supplementary operation, such as printing in one or more colors.

In the case of printing on an offset machine, for example, these thickness variations make it necessary to increase the contact pressure between the lateral surface of the object receiving the printing and the press blanket, so that the ink may reach the thinnest portions. This results in poorer-quality printing and in premature wear and tear of the blanket which, as a result of their more frequent replacement, causes the cost of the printing station to increase.

In the case where the thermoplastic material (prior to the transformation operation) has received a contracted, anamorphosable print, in one or more colors, the length variations, forced by the usual heat-forming means, constitute an obstacle that is difficult to overcome in correctly getting the final drawing after concomitant heat-shaping with the anamorphosis of said printing.

In French patent-of-addition No. 91,333 and French Pat. No. 1,322,860, the applicant has already, in a variation and in an example, disclosed a new punch unit which cooperates with a suitable matrix for the heat-forming of a sheet of thermoplastic material brought to the thermoplasticity temperature, with the punch and the matrix being arranged on either side of said sheet.

The punch is equipped, on its front side, with a small contact surface, in the shape of a disk depressed toward the interior and producing the punching action. The disk is attached perpendicularly and in its center, by known means, to the end of a column with a small diameter opposite the diameter of the forward face of the punch and representing the latter's core.

The other end of this column — long enough to perform the punching action under good conditions — is connected to the activating means of said punch.

This device considerably improves the heat-forming operation but is still insufficient because it uses compressed air to give the punched object its final form, by bringing it down upon the inside wall of th mold.

This placement operation brings about thickness irregularities in the material, caused, on the one hand, by the compressed air, due to the unequal distribution of pressures in the relatively large volume defined by the space existing between the body of the punch and the heat-formed material, and, on the other hand, by the air stored between the inside lateral wall of the matrix and the heat-formed material. The latter is compressed by the final shaping of the object and emerges in a practically unpredictable fashion through outlet holes, likewise reshaping the thickness variations which are of heterothermic origin and which are due to the contact of the edge of the punch with the material.

At the moment of the final heat-forming operation, the thermoplastic material comes into contact with the shaping portion of the matrix, in a different manner, point by point, or zone by zone, and it is solidified in the state in which it is at that moment.

These defects are all the more marked when the spaces to be run through prior to the placement upon the matrix are wider.

As a matter of fact, the thermoplastic material, brought up to heat-forming temperature, maintained on the side of the mold by the press blanket, becomes stretched out in the direction of the latter's bottom under the thrust of the anterior face of the punch which is the object of the above-mentioned patent and patent-of-addition.

This stretch generally represents the height of the heat-formed object and the thermoplastic material, at forming temperature, stretches, not in a straight-line fashion, but along a catenoid, with revolution in the case of objects having a cylindrical shape.

If the development is weak, the diameter of the anterior face of the punch is generally larger than the diameter of the circumference produced on the level of the geometric location of the points of inflection of the catenoid, whose axis then merges with the longitudinal axis of the punch. The circle of this circumference is perpendicular to the axis of preference.

This catenary effect results from the direction of punching forces and the elastoplastic withdrawls which take place perpendicularly to that direction. It is therefore necessary to use compressed air in order to cancel out this effect, placing the thermoplastic material upon the inside walls of the matrix in order to permit the cooling of the material and the withdrawal of the punch.

The device according to the invention is intended to avoid these various inconveniences. With it, in effect, it is possible to get a regular elongation of the thermoplastic material without the appearance of thermic heterogeneity. The homogeneous elongation enables us to get a regular distribution of the thickness over the entire drawn-out surface.

The first advantage of the invention resides in the rather easy way to make the punch.

Another important advantage of the invention resides in the fact that it makes it possible to produce containers showing motifs printed from sheets, bands, or films of thermoplastic material, characterized by the fact that they are printed in advance. The printing is suitably contracted in such a fashion that the final form does not appear by anamorphosis upon the object until after the heat-forming operation, by means of the device according to the invention.

According to a first version of the invention, the punch is adapted to heat-form containers which must reveal proper regularity of thickness at all points on their surface so as to be able to be printed upon under good conditions. This result is achieved due to the disengaged form of the body of the punch which prevents contact with the thermoplastic material at the moment of the action of the forces of elastoplastic withdrawal, in cooperation with the anterior end of the punch, equipped with a series of holes acting as a heat brake in order to reduce the exchange of heat to a minimum.

According to a second version of the invention, the punch is provided so as to form, at its lending end, the internal shape of the container, as well as the latter's body, in order not to allow any freedom for the plastic material during the shaping operation which is always guided in its elongation by the outside wall of said punch.

The main feature of the invention resides in the fact that the outside lateral surface of the punch, in contact with the thermoplastic material, is reduced to the minimum possible size by any known means, such as milling, grooving, etc., in order, in cooperation with the layer of air caught between the points of contact between the punch and the material, to make it possible to reduce the heat exchange to a negligible quantity.

This arrangement offers the advantage —due to the almost complete absence of heat exchange between material and punch —of no longer requiring a very fast heat-forming speed, unless this is necessary to obtain very fast production rates.

Other objectives, features, and advantages of this invention will emerge better from the following description, made with respect to the attached drawings, give here by way of nonrestrictive examples; this will enable us to understand the implementation of the invention better.

Figure 3:
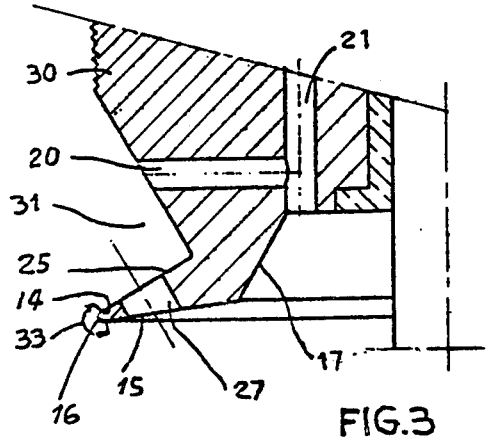
FIG. 3 shows an enlarged cross-section with the active portion of the punch in FIG. 2.
Figure 5:
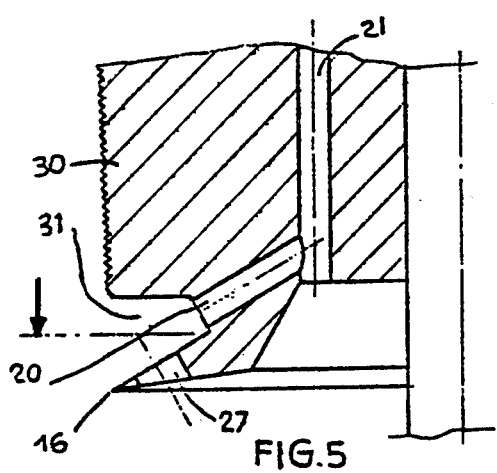
Figure 6:
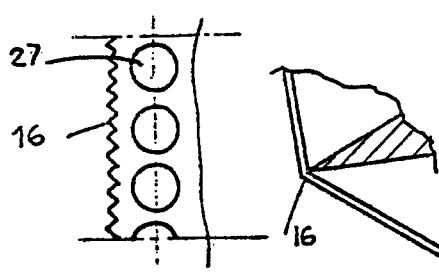

FIGS. 5 and 6 shown a variation of FIG. 3.

Figure 1:
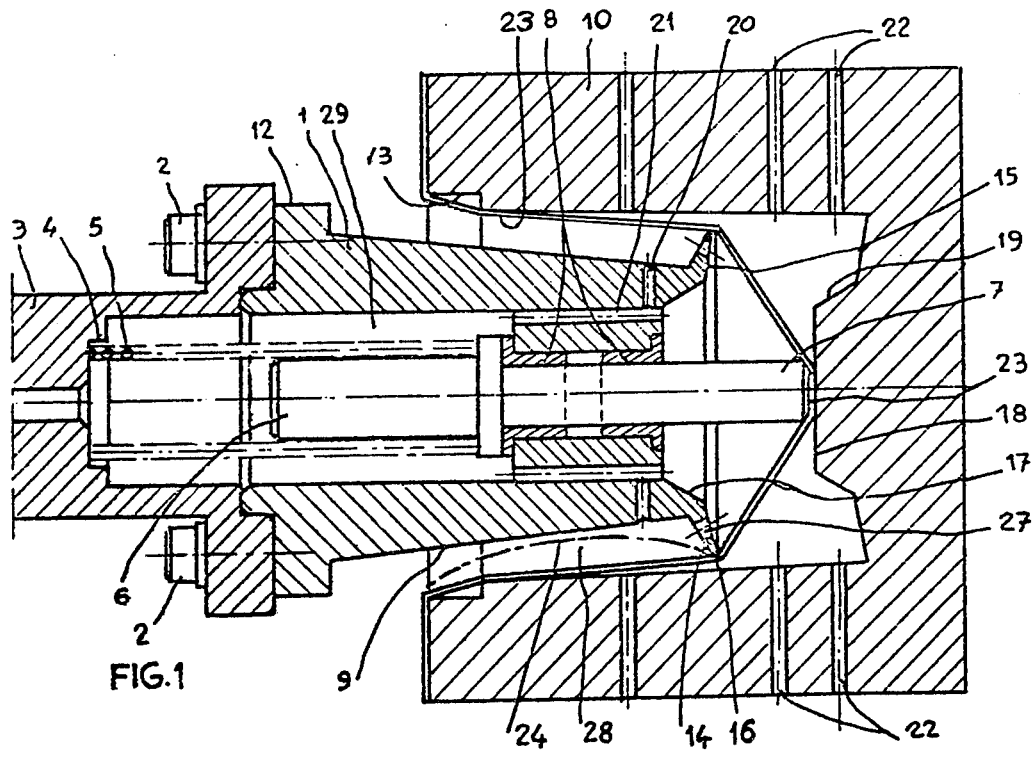
FIG. 1 shows a cross-section of a matrix and a punch, in action, to heat-form cylindrical-concial containers with a collar, to be picked up again for printing.
Figure 2:
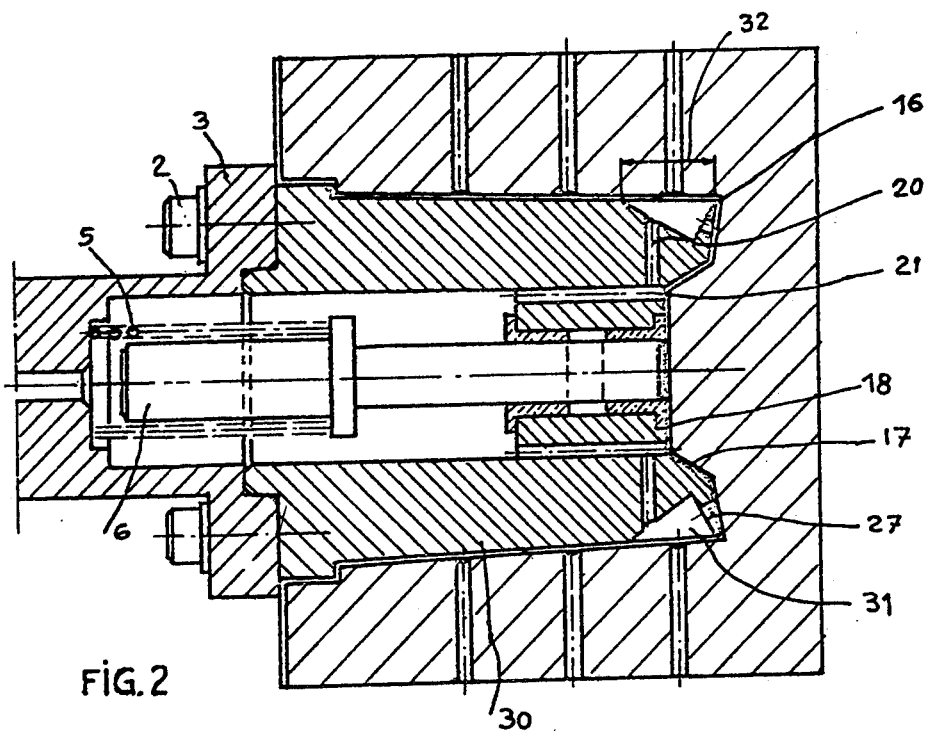
FIG. 2 shows a cross-section of a matrix and a punch for containers on which the graphic design is preprinted and anamorphosed.
Figure 7:
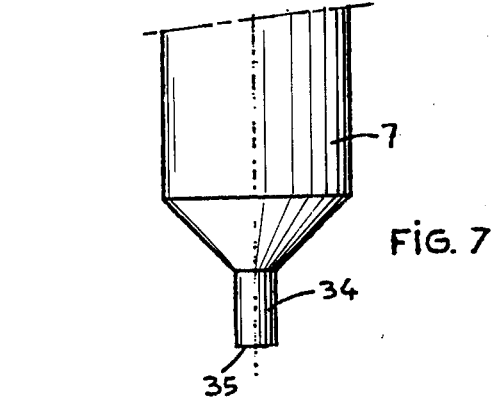

FIG. 7 shows one form of a precessor finger used in the assembly of FIGS. 1 and 2.

Figure 8:
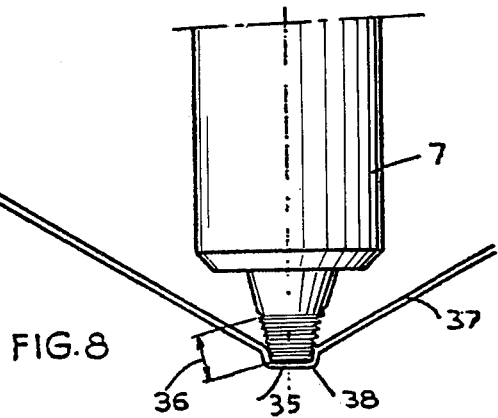

FIG. 8 shows a variation of the precessor finger of FIG. 7.

Figure 9:
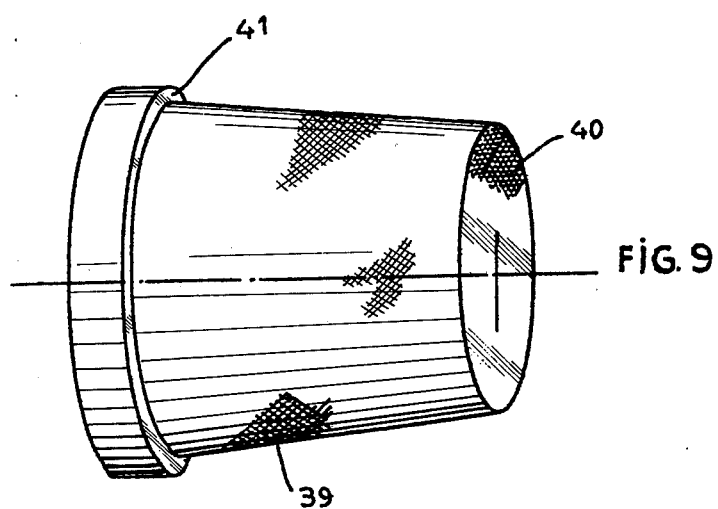

FIG. 9 shows in perspective a tronconic punch, milled on its lateral surface and its anterior surface.

Figure 10:
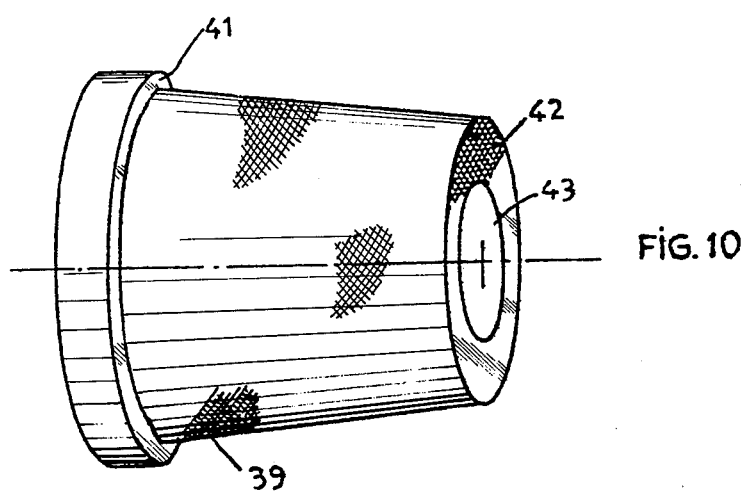

FIG. 10 shows, in perspective, a tronconic punch milled on its entire surface, whose bottom is equipped with a recess in order to obtain an internal relief.

As shown in FIG. 1, the assembly of punch and maxtrix has a punch 1, attached by screws 2 upon the press slide by the intermediate piece 3, which has a centering device 4, carrying a compression spring 5, centered upon the tail 6 of precessor finger 7, sliding in the appropriate holes 8. The punch 1 moves relative to a matrix 10 and the middle portion 9 of punch 1 tapered as matrix 11, about 5° in order to form cylindrical-concial containers. The collar of the container is formed by the external shoulder 12 of the punch and an interior shoulder 13 of the matrix. Punch 1, at its leading end, has a protruding portion 14 which has dimensions equal to those of the bottom of the container to be shaped. The portion 14 of the punch 1 has a first inside cone 15, clearing the periphery 16, and a second truncated cone 17, cooperating with the stop surface 18 of the matrix, which is formed by an end surface of a countercone 19. At its lower end, punch 1 is equipped with outlet holes 20 and 21 and the matrix 10 is equipped with outlet holes 22.

The assembly described functions in the following manner when punch 1 is used with the processor finger 7, at the start of the heat-forming operation, the latter comes into contact with the thermoplastic material 23 which, preferably, has been brought up to proper temperature. The thermoplastic material 23 is secured in the matrix 10 by the leading end of finger 7 and is progressively pushed until the periphery 16 of punch 1 comes into contact with the thermoplastic material which continues the elongation until the end 7 engages the stop surface 18 of countercone 19 in order to raise the bottom of the container.

This engagement causes compressed air to be blown through the chamber 29 and the outlet holes 20 and puts the thermoplastic material 23 in open contact against the wall of the matrix, causing rapid cooling.

During the above movement, the middle portion 9 of the punch 1 does not, at any moment, come into contact with the bending point 24 of the revolution catenoid produced by the thermoplastic material 23 at the end of the elongation, thus preventing a local cooling effect which would generate transition zones.

The thermoplastic material 23, brought up to heat-forming temperature, is elongated in two main directions. The first is the direction where the material 23, held on the side of the mold opening by the press blanket, is elongated in the direction toward the bottom under the pressure of the punch 1. The second one is where the material 23, circumscribed on the inside by the periphery of the punch 1, is elongated while sliding parallel to the latter in a movement relative to the movement of punch 1 and this is all the easier when the surface of the punch end is smaller.

The sliding coefficient must be such that a balanced elongation is obtained between the material, which is drawn from the inside edges of the mold, and that which is drawn by sliding upon the periphery 16 of the punch, without creating any transition zones. To reach this point — upon contact between the periphery of punch 16 and the material to be heat formed — a heat exchange must be prevented in the direction of material/punch which would create a hypothermic situation in the former, leading to a local modification in its elongation qualities and thus causing the appearance of a transition zone. The outside circular portion of the periphery 16 may be reduced to a intersecting line defined between the anterior and posterior cones. Its minimum thickness must only be compatible with the necessary mechanical resistance and this portion of the punch may be perforated with holes 27, properly placed, reducing the zones of heat transfer toward the massive portion of the punch.

A punch made according to FIG. 1 produces very good results. However, in spite of the reduction of the ring-shaped chamber 28 with respect to the patent and the patent of addition mentioned above, the compressed air coming from the distribution chamber 29, through conduits 20, intended to force the material into the mold, still causes variations in the thickness on the lateral wall of the object. These variations may be insignificant for the direct use of the container or even if it is supposed to receive a print by means of transfer or any other means, but they are prohibitive when it comes to getting a correct anamorphosed impression. This leads to another way of making the punch, as in FIG. 2.

In FIG. 2, the same reference figures designate the same parts as in FIG. 1. Here a punch 30 is provided whose lower end terminates in the same fashion as in FIG. 1. A ring-shaped space 31 provides sheet insulation for the crest of the punch and makes it possible to bring out the holes 27 and the blowholes 20. The length 32 of space 31 permits the immediate elongation of the material, from the moment it starts sliding on the outside edge 16. The outside volume of punch 30 roughly corresponds to the inside volume of the container to be shaped.

The blowing operation at the end of heat-forming — in which the thermoplastic material is forced upon the wall of the mold for cooling — no longer involves the risk of modifying the corect distribution of the elongation since its only purpose is to force the thermoplastic material the minimum distance between the punch and the matrix. To prevent any possiblity of heat exchange between the thermoplastic material, in contact over the entire lateral surface of the punch, the latter is reduced to the minimum possible, preferably by diamond-point milling, leaving only a plurality of peaks, reduced to points on which the material rests. Between these points of contact — defining the outside envelope of the punch and the thermoplastic material — there is caught, in the hollow spaces, a layer of air which opposes any possibility of heat exchange between the material and the punch, which would generate heterothermia and elongation anomalies. The thermoplastic material in the course of heat-forming is always placed upon the surface of the punch by its internal elastoplastic stresses. The milling pitch (between peaks) may for example be 0.5 mm. Of course, all other means of reducing the contact surface between the material and the punch — such as threading, grooving, either in direction and/or in cooperation, granulcation, chemical microcraters, elecrro-erosion, miscellaneous coatings — do not go beyond the framework of the invention.

The punches may have any shapes and dimensions. Without going beyond the framework of the invention, the milling can be done locally, for example, in the region of contact between the punch and the material, on the level of the bending points of the catenary, in the case where the punch is provided with a disengagement device to form a chamber as we can see at 28 in FIG. 1, but smaller. This arrangement of the punch enables us to prevent any heat loss in the thermoplastic material and the achieve the elongated homogeneity which is indispensable in the case of anamorphosable printing.

The friction of the plastic material upon the envelope of the punch is extremely reduced. At the boundary, there cannot be any leeway between the punch and the material and at the moment of arrival at the bottom of the matrix, the thermoplastic material is then directly forced upon the wall of the mold by the punch itself, which prevents the air blowing operation.

FIG. 3 shows, in an enlarged cross section, the active portion of the punch 1. The same reference figures designate the same members as in the preceding figure. In this figure, periphery 16 is deliberately shown thick and terminated by a rounded portion made in the case of the shaping of containers with great thickness and/or with a shape other than circular, presenting greater mechanical resistance. In this case, to prevent any heat exchange which would be harmful to the good homogeneity of the elongation, the zone outlined at 33 is finely milled to reduce the contact surface.

Figure 4:
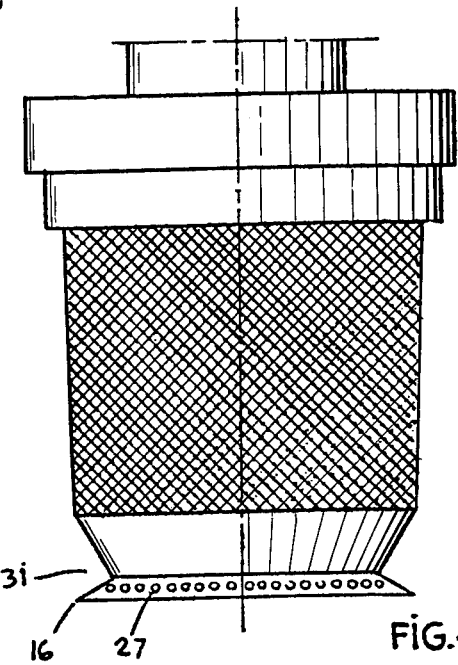
FIG. 4 shows a cross-section of a punch for containers with a rectangular cross section.

The punch shown in FIG. 4 enables containers to be formed with a rectangular shape. The same reference figures designate the same parts. This figure shows the milling of the lateral face of the punch. The bottom of the punch may remain flat of the punch. The bottom of the punch may remain flat in order to get containers with a flat bottom. In this case, the bottom of the punch is also milled over its entire surface. The milling may be replaced by rough-line machining, with the steps of the tool performing a surface reduction action similar to milling. This punch may be used with or without precessor finger. The punches are preferably made in inoxydable steel.

The variation in FIGS. 5 and 6 shows a periphery 16 which is very sharp and which is located on the periphery of the punch. This part 16 may also be milled as shown in FIG. 6 to enable absolutely perfect drawings to be obtained by anamorphosis. One variation of the form of the disengagement 31 is also presented. Of course, other forms are possible without going beyond the framework of the invention.

The variations in the shape of the precessor finger, shown in FIGS. 7 and 8, are intended further to improve the quality of homogeneity of the elongation of the thermoplastic material in order to get anamorphosed designs. In FIG. 7 a cylindrical portion 34 is connected by a cone to the body 7 of the processor finger. Surface 35 has a diameter of 2 mm, for example, and is finely polished to increase the glueing effect due to the solidification of the thermoplastic material.

In FIG. 8 the same cylindrical surface 35 is connected to body 7 directly by a cone the outer surface of a portion of which is milled over a length 36, so as to prevent the cooling of the material outside the surface 35. The plastic material 37 in part goes up on this cone at the moment of penetration of the precessor finger. The small cone 38 thus defined emerges from the bottom of the container after shaping if we provide an equivalent recess in part 18 of the matrix. It can be provided in such a way that it would reduce the thickness of the material in the case of utilization of a container to hold creams or other such products, the removal from the mold after opening being performed by breaking, bursting, or cutting this portion.

The main purpose of the use of the precessor finger is to permit the regular centering and elongation of the thermoplastic material, from the small surface which has become fixed to the end of the finger, all the way to the collar of the container, by varying the thickness of the bottom of the container to a greater or lesser extent.

As a matter of fact, the initial thicknes of the blanket may thus be distributed over almost all of the walls of the container. It is preferable to immobilize the rotating precessor finger in order to avoid changes in the anamorphosis of the graphic design.

In case the punch is entirely milled on its lateral surface and on its anterior face, we cannot use the precessor finger.

The tronconic punch, shown in perspective in FIG. 9, does not have a precessor finger. It is diamond-point milled on its lateral surface 39 and on its anterior flat surface 40. The collar 41 of this type of punch, at the end of the run, hits the corresponding portion of the matrix so that the diamond-points or any other form of reducing the surface cannot become dull or become weak, or even split the bottom of the object which has been shaped.

The tronconic punch shown in FIG. 10 is similar to the one in FIG. 9, except for the anterior milled portion 42 which has a recess 43 to get an inside relief in the object to be shaped. In tronconic pots, where the contact surface with the thermoplastic matter is reduced by diamond-point-type milling, this milling diverges toward the major diameter, the pyramids are truncated and the surface of the points of contact with the thermoplastic material grows; but this does not cause any trouble since the latter comes into contact with this portion of the punch only at the precise moment when the forming terminates.

This is not true of the cylindrical or parallelepipedic punches. The latter may not have any milling or other means of reducing the contact surface on their lateral surface (39), provided the taper is very small.

The spacing between the contact points has such dimensions that the catenary effect, which might develop here, will not influence the forming of the objects.

Of course, these various punches may be grouped so as to obtain the simultaneous heat-forming of several objects.

I claim:

1. An apparatus for molding a heated sheet of thermoplastic material having a predistorted motif printed thereon, comprising a die member defining a chamber with a bottom and walls extending from said bottom, means for securing said sheet to the die member in a position extending over the mouth of the chamber, a punch member having a leading face and outer surface adapted for reciprocal movement into and out of the chamber, the leading outermost edge of the punch member defining a leading contact edge for contacting said sheet when the punch is moving into the chamber, the leading outermost edge being formed of two converging surfaces formed by said leading face and a space located around the outer surface of the punch member tapering inwardly and away from said leading outermost edge, a plurality of openings in said two converging surfaces for communicating said surfaces, said leading face and outer surface being shaped and dimensioned to mate with the bottom and walls, respectively, of the chamber, said outer surface being machined with interconnected surface depressions for providing minimum engagement points with said sheet, blowholes in said punch member communicating with said space in the outer walls and said leading outermost edge, and means for selectively providing gas under pressure to said blowholes.

2. The apparatus in claim 1 and further including a precessor finger projecting from said leading face for first engaging said sheet, said finger being mounted in said punch member to enable it to retract into said punch member upon engagement with the bottom of the die member so that the punch member can continue to move into said chamber thereafter.

3. The apparatus in claim 1, wherein the leading contact edge is rounded and milled.

4. The apparatus in claim 1, wherein said leading edge is sharp.

5. The apparatus in claim 1, wherein the leading face is flat and milled over its entire surface.

6. The apparatus in claim 1, wherein the leading face includes said converging surface thereon tapering inwardly from said leading edge.

7. The apparatus in claim 1, wherein said surface depressions are formed of diamond-point milling with a pitch of 0.5 mm.

8. The apparatus in claim 2, wherein the leading end of the finger is machined with interconnected surface irregularities.

* * * * *